United States Patent [19]

Koblick et al.

[11] 3,742,332

[45] June 26, 1973

[54] PULSE TRANSFORMER FOR DRIVING THYRISTORS

[75] Inventors: Christian Koblick; Ernst Müller, both of Munich; Klaus Rambold, Erlangen, all of Germany

[73] Assignee: Siemens Aktiengesellschaft, Munich, Germany

[22] Filed: Mar. 1, 1972

[21] Appl. No.: 230,621

[30] Foreign Application Priority Data

Mar. 4, 1971 Germany .................. P 21 10 276.1

[52] U.S. Cl. .................. 321/11, 307/252 N, 321/47

[51] Int. Cl. ............................................ H02m 1/18

[58] Field of Search .................... 307/252 B, 252 G, 307/252 N; 321/2, 5, 11; 336/84

[56] References Cited

UNITED STATES PATENTS

| | | | |
|---|---|---|---|
| 2,724,108 | 11/1955 | Hayes et al. | 336/84 X |
| 3,279,379 | 10/1966 | Klyce | 307/252 N X |
| 2,731,589 | 1/1956 | Marsh | 336/84 X |
| 2,878,441 | 3/1959 | Rogers et al. | 336/84 X |
| 3,039,042 | 6/1962 | Chatterton | 336/84 X |
| 3,061,804 | 10/1962 | Bereskin | 336/84 |
| 3,611,106 | 10/1971 | Mooney et al. | 321/5 |
| 3,662,248 | 5/1972 | Amano et al. | 321/11 |

*Primary Examiner*—William M. Shoop, Jr.
*Attorney*—Hugh A. Chapin

[57] ABSTRACT

In a pulse transformer used to drive thyristors two metal shields are provided to reduce undesirable displacement currents and other interference currents. The two overlapping metal shields, which are separated from each other, are arranged between the primary and secondary windings of the pulse transformer. One shield is connected with the cathode of the driven thyristor and the other is connected with chassis ground or the primary potential of the pulse transformer.

12 Claims, 5 Drawing Figures

PULSE TRANSFORMER FOR DRIVING THYRISTORS

BACKGROUND OF THE INVENTION

1. Field of the Invention

The invention relates to electronic circuitry and more particularly to pulse transformers for driving thyristors, on the cathodes of which steep potential changes are impressed.

2. Description of the Prior Art

In prior art thyristor controls for converter apparatus, such as that indicated in FIG. 1, undesired displacement currents may develop as a result of the capacitances C of the pulse transformer. These currents are fed in part to the control terminal of the thyristor 3 and can result in faulty firing. The capacitances C are determined by the coupling capacitance of the adjacent winding layers (i.e., the insulation of the windings), as well as the capacitances of the transformer core.

These displacement currents occur as a result of the potential difference which must follow any potential change at the thyristor 3 and which is applied as the capacitor voltage to these capacitances C. Referring to FIG. 1, the displacement current flows on the secondary side 2 of the transformer in two ways, namely: on the one hand, as the displacement current $i_{cl}$ directly to the cathode terminal *k;* and on the other hand, as the displacement current $i_{c2}$ via the diode 4 in the control path to the cathode terminal of the thyristor 3 if a negative potential jump occurs at the cathode of the thyristor in question. Before it reaches the capacitances C, the displacement current must flow through the windings 1 and 2 of the pulse transformer. Since the displacement current on the primary side can flow only from P through at least part of the primary winding 1, an additional, transformed displacement current $i_{c3}$ will flow as an interference current on the secondary side 2 via the control path of the thyristor 3. The interference currents can lead to the unintentional firing of the thyristor 3. A detrimental effect can also be caused by interference currents which flow via the control terminal of the thyristor 3 as it is extinguished, as part of the return currents.

SUMMARY OF THE INVENTION

The object of this invention is to provide a simple means to prevent or reduce undesired displacement currents and other interference currents in the control path of thyristors driven by pulse transformers.

According to the invention, the solution of the problem is to provide two overlapping metal shields, separated from each other, between the primary and secondary windings of the pulse transformer. One of the metal shields is connected to the cathode of the driven thyristor and the other metal shield is connected to the chassis ground or the primary potential of the pulse transformer. The contact points are at points on the metal shields which are positioned facing each other. The leads to the contact points are arranged to run in parallel so that a bifilar structure exists for displacement currents.

DETAILED DESCRIPTION

The details of the invention will be explained by reference to the embodiments shown in FIGS. 2 to 5.

Figure 1:
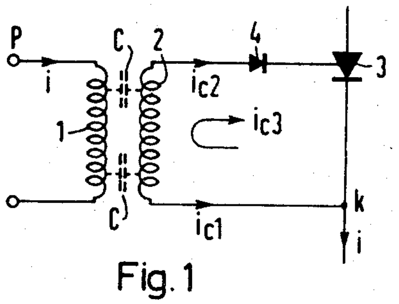
FIG. 1 is an electrical schematic of a prior art pulse transformer for driving a thyristor, illustrating the problem which the present invention is designed to overcome.
Figure 2:
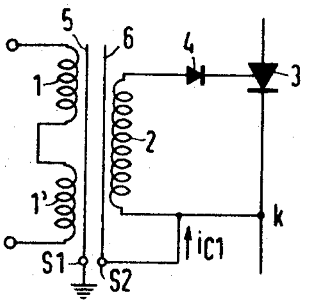
FIG. 2 is an electrical schematic of one embodiment of the present invention.
Figure 4:
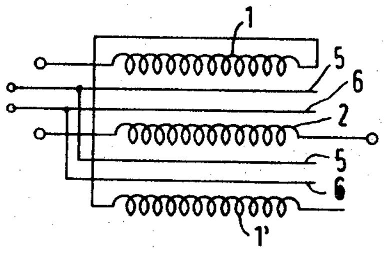
FIG. 4 is a schematic showing the physical position of the two metal shields in relation to the two coils of the primary winding shown in FIGS. 2 and 3.

Referring to FIG. 2, the primary winding consists of two coils 1 and 1', electrically connected in series. Referring to FIG. 4, the two coils 1 and 1' of the primary winding physically enclose the secondary winding 2 and thus two metal shields 5 and 6. The two metal shields 5 and 6 are arranged side by side, but separated from each other, between the secondary winding 2 and each coil 1 and 1' of the primary winding. Referring to FIG. 2, the metal shield 5 is connected with its lead S1 to chassis ground and the metal shield 6 is connected with its lead S2 to the cathode of the driven thyristor 3, so that the displacement current $i_{cl}$ flows directly to the cathode and no displacement current $i_{c2}$ (such as that shown in FIG. 1) occurs.

No displacement current $i_{c3}$ (such as that shown in FIG. 1) can flow in the secondary winding 2 because the shield 5 near the primary winding 1 and 1' prevents the displacement current from flowing in the primary winding.

Figure 5:
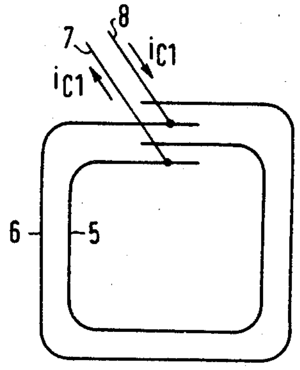
FIG. 5 is a schematic of an alternate configuration in which the metal shields of FIG. 4 may be positioned.

Referring to FIG. 5, the configuration of two metal shields 5 and 6 may be positioned one within the other and arranged about a core (not shown) and between the primary and secondary windings (also not shown). The contact points at the one end of each shield 5 and 6 with the parallel-run leads 7 and 8 are positioned facing each other, so that a bifilar structure exists for the displacement currents and no undesired flux through the core can occur.

Figure 3:
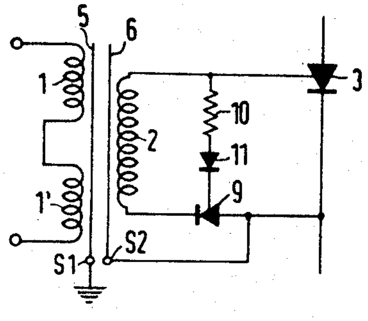
FIG. 3 is an electrical schematic of a second embodiment of the present invention in which an auxiliary thyristor has been provided.

Referring to FIG. 3, an auxiliary thyristor 9 may be provided. The anode terminal of auxiliary thyristor 9 is connected to the cathode terminal of the driven thyristor 3 and to the metal shield 6 which is connected to the cathode terminal of the driven thyristor 3 so that, in the extinguishing process, part of the return current cannot get to the control electrode of the thyristor 3. Auxiliary thyristor 9 is connected on the cathode side directly to the terminal of the secondary winding 2. The control electrode of auxiliary thyristor 9 is connected by diode 11 and limiting resistor 10 to the control electrode of the thyristor 3.

The auxiliary thyristor 9 is triggered by the control pulse for the driven thyristor 3 and after the end of the pulse, it goes into the cut-off state. The control pulse is terminated prior to the end of the current conduction of the thyristor 3, so that the auxiliary thyristor 9 prevents a partial return current via the control terminal. Instead of being triggered by the control pulse for thyristor 3, the auxiliary thyristor 9 may be driven by a second, low-capacitance transformer, not shown.

In order to reduce the capacitance of the pulse transformer it is advantageous to use insulating material with a low dielectric constant $\epsilon$ (for instance, polytetrafluor ethylene with $\epsilon = 2.1$) in conjunction with a high breakdown voltage, the size of the insulating spacings being limited by the requirement for the best possible magnetic coupling (steep pulse flanks). The insulating material is disposed between the shields and the windings.

In the foregoing, the invention has been described in reference to specific exemplary embodiments. It will be evident, however, that variations and modifications, as well as the substitution of equivalent circuitry and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. In a pulse transformer for driving thyristors, on the cathodes of which steep potential changes are impressed, wherein the pulse transformer has primary and secondary windings and a chassis ground, the combination with said pulse transformer and thyristors of two overlapping metal shields, separated from one another and arranged between the primary and secondary windings of the pulse transformer, one of said metal shields being connected to the cathode of the driven thyristor, said thyristor being arranged in circuit on the secondary winding side of said pulse transformer; and the other metal shield being connected to the chassis ground; and wherein the contact points on the metal shields are positioned facing each other and the leads to the contact points are arranged to run in parallel so that a bifilar structure exists for displacement currents.

2. In a pulse transformer for driving thyristors, the combination of two metal shields according to claim 1, wherein the two metal shields are positioned one within the other and arranged about a core.

3. In a pulse transformer for driving thyristors, the combination of two metal shields according to claim 1, wherein one of the metal shields is connected to the cathode of the driven thyristor and the other metal shield is connected to the primary potential of the pulse transformer.

4. In a pulse transformer for driving thyristors, the combination of two metal shields according to claim 1, and further comprising the use of insulating material, having a low dielectric constant and a high breakdown voltage, disposed between the shields and the windings.

5. In a pulse transformer for driving thyristors, on the cathodes of which steep potential changes are impressed, wherein the pulse transformer has primary and secondary windings and a chassis ground, the combination with said pulse transformer and thyristors of two overlapping metal shields, separated from one another and arranged between the primary and secondary windings of the pulse transformer, one of said metal shields being connected to the cathode of the driven thyristor and the other metal shield being connected to the chassis ground, said combination further comprising an auxiliary thyristor, the anode terminal of said auxiliary thyristor being connected to the cathode terminal of the driven thyristor and to the metal shield which is connected to a driven thyristor, the cathode side of the auxiliary thyristor being connected to the terminal of the secondary winding and the control electrode of the auxiliary thyristor being connected to the control electrode of the driven thyristor.

6. In a pulse transformer for driving thyristors, the combination of two metal shields and an auxiliary thyristor according to claim 5, and further comprising a diode and a limiting resistor which are connected between the control electrode of the auxiliary thyristor and the control electrode of the driven thyristor.

7. In a pulse transformer for driving thyristors, the combination of two metal shields and an auxiliary thyristor according to claim 5, wherein the auxiliary thyristor is triggered by the control pulse for the driven thyristor.

8. In a pulse transformer for driving thyristors, the combination of two metal shields and an auxiliary thyristor according to claim 5, wherein the auxiliary thyristor is driven by a second, low-capacitance transformer.

9. In a pulse transformer for driving thyristors, the combination of two metal shields according to claim 5, wherein the contact points on the metal shields are positioned facing each other and the leads to the contact points are arranged to run in parallel so that a bifilar structure exists for displacement currents.

10. In a pulse transformer for driving thyristors, the combination of two metal shields according to claim 5, wherein the two metal shields are positioned one within the other and arranged about a core.

11. In a pulse transformer for driving thyristors, the combination of two metal shields according to claim 5, wherein one of the metal shields is connected to the cathode of the driven thyristor and the other metal shield is connected to the primary potential of the pulse transformer.

12. In a pulse transformer for driving thyristors, the combination of two metal shields according to claim 5, and further comprising the use of insulating material, having a low dielectric constant and a high breakdown voltage, disposed between the shields and the windings.

* * * * *